United States Patent
Pham et al.

(10) Patent No.: US 9,479,294 B2
(45) Date of Patent: Oct. 25, 2016

(54) WIRELESS TRANSMISSION CONTROL FOR IMPROVED AGGREGATED CELL THROUGHPUT CAPACITY AND SIGNALING RELIABILITY

(71) Applicant: Alcatel Lucent, Paris (FR)

(72) Inventors: Huy Thang Pham, Dollard-des-Ormeaux (CA); Jindong Hou, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 175 days.

(21) Appl. No.: 13/941,956

(22) Filed: Jul. 15, 2013

(65) Prior Publication Data
US 2015/0016284 A1    Jan. 15, 2015

(51) Int. Cl.
  *H04L 1/18*    (2006.01)
  *H04L 1/00*    (2006.01)
  *H04W 28/18*   (2009.01)

(52) U.S. Cl.
  CPC .......... *H04L 1/1829* (2013.01); *H04L 1/0026* (2013.01); *H04W 28/18* (2013.01)

(58) Field of Classification Search
  CPC .. H04L 5/0037; H04W 28/04; H04W 24/00; H04W 72/047
  See application file for complete search history.

(56) References Cited

U.S. PATENT DOCUMENTS

| | | | |
|---|---|---|---|
| 2008/0026744 A1* | 1/2008 | Frederiksen et al. | 455/425 |
| 2008/0076359 A1* | 3/2008 | Charpentier et al. | 455/63.1 |
| 2008/0311923 A1* | 12/2008 | Petrovic et al. | 455/450 |
| 2009/0201871 A1* | 8/2009 | Sambhwani et al. | 370/329 |

OTHER PUBLICATIONS $3^{rd}$ Generation Partnership Project; Technical Specification Group Radio Access Network; High Speed Downlink Packet Access (HSDPA); Overall description; Stage 2 (Release 11); Technical Specification 3GPP TS 25.308 v11.0.0 (Dec. 2011).

* cited by examiner

*Primary Examiner* — Andrew Lai
*Assistant Examiner* — Chuong M Nguyen
(74) *Attorney, Agent, or Firm* — Tong, Rea, Bentley & Kim, LLC (57) ABSTRACT

A wireless transmission control capability may be used to control downlink (DL) transmissions for a set of wireless user devices or for an individual wireless user device. A DL transmission control capability for a set of wireless user devices may include receiving DL channel operating parameter information associated with a set of cells, determining DL channel operating parameter distribution information based on the DL channel operating parameter information, and determining default DL channel operating parameter information for the set of cells based on the DL channel operating parameter distribution information and a target associated with the set of cells. A DL transmission control capability for an individual wireless user device may include determining radio link layer (RLL) retransmission information associated with a wireless user device and determining, based on the RLL retransmission information associated with the wireless user device, whether to modify an attribute of the wireless user device.

23 Claims, 6 Drawing Sheets

WIRELESS TRANSMISSION CONTROL FOR IMPROVED AGGREGATED CELL THROUGHPUT CAPACITY AND SIGNALING RELIABILITY

TECHNICAL FIELD

The disclosure relates generally to wireless communication networks and, more specifically but not exclusively, to improvement of aggregated cell throughput capacity and signaling reliability in wireless communication networks.

BACKGROUND

In a typical Universal Mobile Telecommunications System (UMTS)/High Speed Packet Access (HSPA) system, a User Equipment (UE) with a Radio Resource Control (RRC) Connection can be in one of the following states: Cell Dedicated Channel (CELL_DCH), Cell Forward Access Channel (CELL_FACH), Cell Paging Channel (CELL_PCH), or UMTS Terrestrial Radio Access Network (UTRAN) Registration Area Paging Channel (URA_PCH). A UE with data traffic is put into the CELL_DCH state or the CELL_FACH state, such that the UE is able to transmit and receive user data. A UE with low burst traffic activity typically is put into the CELL_FACH state.

The Third Generation Partnership Project (3GPP) develops releases of UMTS-based systems, such as the UMTS/HSPA system. In 3GPP Release 7, a new state (denoted as Enhanced CELL_FACH) was introduced into the UMTS/HSPA system in order to allow a UE to receive High Speed Downlink Packet Access (HSDPA) packets, thereby enabling the UE to receive large bursts of downlink traffic. In 3GPP Release 8, another new state (denoted as Enhanced Uplink CELL_FACH) was introduced into the UMTS/HSPA system in order to allow a UE to send High Speed Uplink Packet Access (HSUPA) packets, thereby enabling the UE to send large bursts of uplink traffic. The Enhanced Uplink CELL_FACH state is a superset of the Enhanced CELL_FACH state, meaning that the HSUPA in CELL_FACH requires the HSDPA in CELL_FACH. The bursty nature of smartphone traffic is well suited for the Enhanced Uplink CELL_FACH state, because the Enhanced Uplink CELL_FACH state uses resources (namely, HSDPA and HSUPA resources) more efficiently than the CELL_DCH state. As the number of smartphone devices is expected to increase significantly in the future, it also is expected that increasing numbers of UEs will reside in the Enhanced Uplink CELL_FACH state.

Disadvantageously, however, while the introduction of such new states has certain advantages, the introduction of such states also may cause degradations in aggregated cell throughput capacity and signaling reliability.

SUMMARY OF EMBODIMENTS

Various deficiencies in the prior art may be addressed by embodiments for providing downlink (DL) transmission control in a wireless communication system.

In one embodiment, an apparatus includes a processor and a memory communicatively connected to the processor. The processor is configured to receive DL channel operating parameter information associated with a set of cells of a wireless communication network, where the set of cells is configured to support a set of wireless user devices. The processor is configured to determine DL channel operating parameter distribution information for the set of cells based on the DL channel operating parameter information. The processor is configured to determine default DL channel operating parameter information for the set of cells based on the DL channel operating parameter distribution information and a target associated with the set of cells.

In one embodiment, a method includes using a processor and a memory for receiving DL channel operating parameter information associated with a set of cells of a wireless communication network where the set of cells is configured to support a set of wireless user devices, determining DL channel operating parameter distribution information for the set of cells based on the DL channel operating parameter information, and determining default DL channel operating parameter information for the set of cells based on the DL channel operating parameter distribution information and a target associated with the set of cells.

In one embodiment, an apparatus includes a processor and a memory communicatively connected to the processor. The processor is configured to determine radio link layer (RLL) retransmission information associated with a wireless user device. The processor is configured to determine, based on the RLL retransmission information associated with the wireless user device, whether to modify an attribute of the wireless user device.

In one embodiment, a method includes using a processor and a memory for determining radio link layer (RLL) retransmission information associated with a wireless user device and determining, based on the RLL retransmission information associated with the wireless user device, whether to modify an attribute of the wireless user device.

BRIEF DESCRIPTION OF THE DRAWINGS

The teachings herein can be understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a wireless transmission control capability is presented. In at least some embodiments, the wireless transmission control capability may be configured to control various aspects of downlink (DL) transmissions for a set of cells (and, thus, for a set of wireless user devices (WUDs) served by the cell(s) in the set of cells). In at least some embodiments, the wireless transmission control capability may be configured to determine default DL channel operating parameter information (e.g., one or more default channel quality indicator (CQI) parameter values, a value of a default blind DL retransmission parameter, and the like) for a set of cells based on DL channel operating parameter distribution information associated with the set of cells. In at least some embodiments, the wireless transmission control capability may be configured to determine radio link layer (RLL) retransmission information (e.g., for retransmissions controlled by the Radio Link Control (RLC) protocol or any other suitable protocol operating at the RLL) associated with a WUD, and determine, based on the RLL retransmission information associated with the WUD, whether to modify an attribute of the WUD (e.g., whether to adjust a DL channel operating parameter for the WUD (e.g., a CQI parameter, a blind DL retransmission parameter, and the like), whether to force a state transition (e.g., from the CELL_FACH state to the CELL_DCH state) for the WUD (e.g., which also may be referred to as forcing an always-on upsize of the WUD), and the like, as well as various combinations thereof). It will be appreciated that various combinations of such embodiments may be used. It will be appreciated that various embodiments of the wireless transmission control capability may be better understood by way of reference to FIG. 1, which presents an exemplary wireless communication system that is configured to supporting various embodiments of the wireless transmission control capability. It will be appreciated that, although primarily presented within the context of a specific type of wireless communication system (namely, a Universal Mobile Telecommunications System (UMTS)/High Speed Packet Access (HSPA) wireless communication system), various embodiments of the wireless transmission control capability may be provided in various other types of wireless communication systems.

Figure 1:
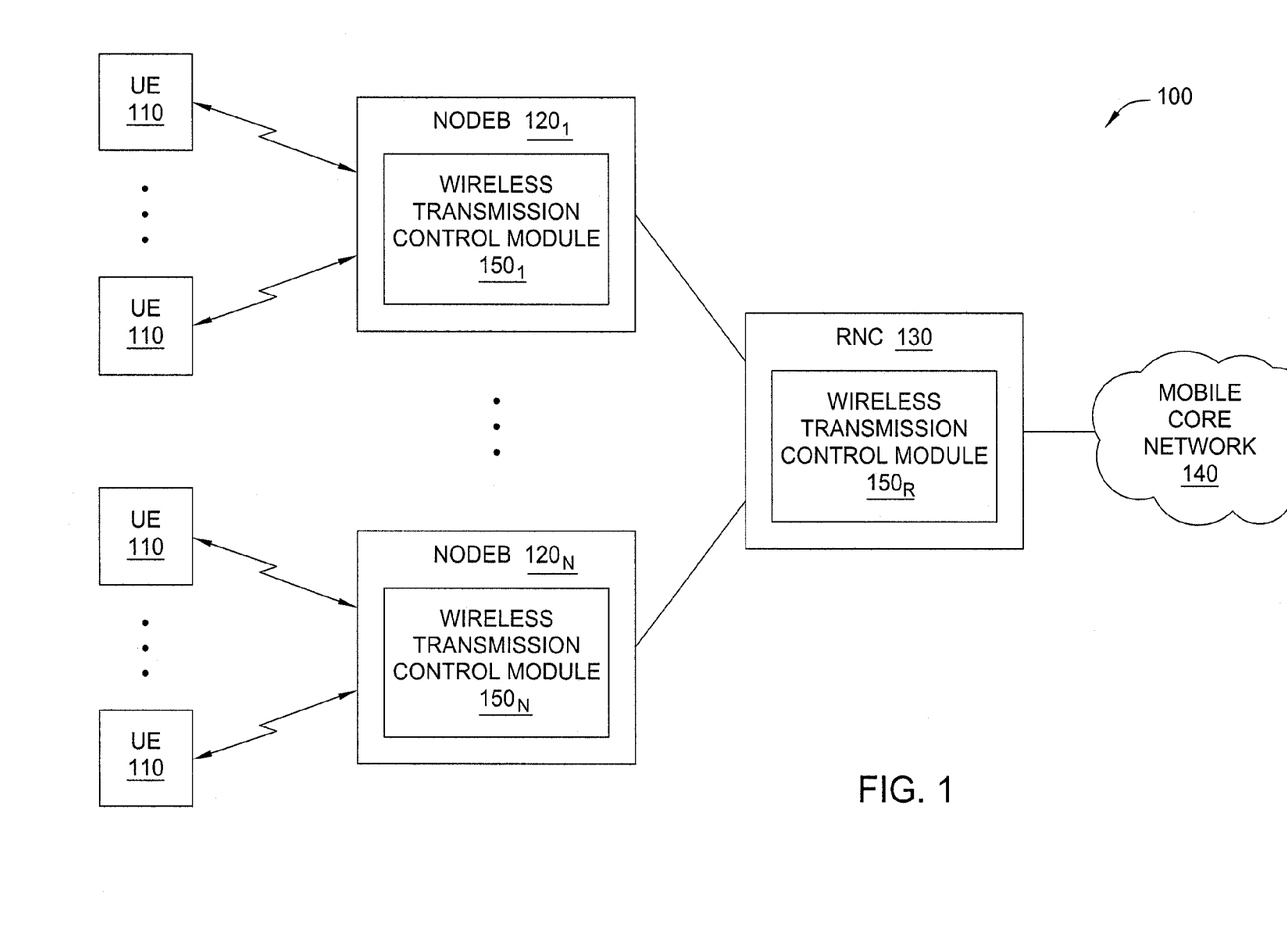
FIG. 1 depicts an exemplary wireless communication system configured to support embodiments of a wireless transmission control capability.

FIG. 1 depicts an exemplary wireless communication system configured to support embodiments of a wireless transmission control capability.

The wireless communication system 100 is a UMTS/HSPA wireless communication system. The wireless communication system 100 may include support for one or more of 3GPP Release 6, 3GPP Release 7, 3GPP Release 8, or any other suitable 3GPP Release, as well as various combinations thereof. The typical configuration and operation of a UMTS/HSPA wireless communication system will be understood by one skilled in the art.

The wireless communication system 100 includes a plurality of User Equipments (UEs) 110, a plurality of NodeBs 120$_1$-120$_N$ (collectively, NodeBs 120), a Radio Network Controller (RNC) 130, and a mobile core network (MCN) 140.

The UEs 110 may include any suitable types of wireless user devices (WUDs) which may communicate via a UMTS/HSPA wireless communication system. The UEs 110 are configured to communicate with NodeBs 120 wirelessly via uplink (UL) channels and DL channels (e.g., UL Radio Bearers (RBs) and DL RBs). The UEs 110 may include one or more of 3GPP Release 6 UEs (e.g., supporting Cell Dedicated Channel (CELL_DCH), Cell Forward Access Channel (CELL_FACH), Cell Paging Channel (CELL_PCH), and UMTS Terrestrial Radio Access Network (UTRAN) Registration Area Paging Channel (URA_PCH) states), 3GPP Release 7 UEs (e.g., supporting the 3GPP Release 6 states plus an additional Enhanced CELL_FACH state), 3GPP Release 8 UEs (e.g., supporting the 3GPP Release 7 states plus an Enhanced Uplink CELL_FACH), and the like. For example, the UEs 110 may include cellular phones, smartphones, laptops, tablet computers, and the like.

The NodeBs 120 provide cellular wireless access to UEs 110. The NodeBs 120 are communicatively connected to RNC 130, and are controlled by RNC 130. The NodeBs 120 support UL channels (e.g., UL RBs) from UEs 110 and DL channels (e.g., DL RBs) to UEs 110. The NodeBs 120 each may support one or more cells, respectively. The NodeBs 120$_1$-120$_N$ include a plurality of wireless transmission control modules (WTCMs) 150$_{N1}$-150$_{NN}$ (collectively, WTCMs 150$_N$), respectively.

The RNC 130 provides radio network control functions for the NodeBs 120. The RNC 130 may be configured to perform functions such as radio resource management, mobility management, and the like. The RNC 130 is communicatively connected to MCN 140, which may include various types of connections depending on the implementation of MCN 140. The RNC 130 optionally may include a WTCM 150$_R$.

The MCN 140 provides a core network facilitating communications between UEs 110 and other types of networks (e.g., a Public Switched Telephone Network (PSTN), the Internet, and the like). For example, MCN 140 may include a Mobile Switching Center (MSC) that is communicatively connected to RNC 130 in order to facilitate communications between UEs 110 and the PSTN. For example, MCN 140 may include a Serving GPRS Support Node (SGSN) that is communicatively connected to RNC 130 in order to facilitate communications between UEs 110 and the Internet. The MCN 140 may include other types of elements which may facilitate communications by UEs 110.

It will be appreciated that communications between the various elements of wireless communication system 100 may be performed at various communication layers (e.g., which may be based on layers of the Open Systems Interconnection (OSI) model or any other suitable model). For example, communications between UEs 110 and NodeBs 120 may be performed at the physical layer (which also may be referred to as L1), at the data link layer or link layer (which also may be referred to as L2 and, further, in the case of wireless transmissions, also may be referred to as the RLL), at the network layer (which also may be referred to as L3), and so forth. It also will be appreciated that various types of protocols may be used at the different layers. For example, Hybrid Automatic Repeat Request (HARQ) and other similar protocols may be used to control downlink retransmissions at the physical layer, the RLC protocol and other similar protocols may be used to control retransmissions at the data link layer, and so forth. The various protocols which may be used to provide various functions at the various communication layers will be understood by one skilled in the art.

It will be appreciated that, although primarily presented with respect to embodiments in which wireless communication system 100 includes specific numbers and arrangements of UEs 110, NodeBs 120, RNC 130, and MCN 140, wireless communication system 100 may include various other numbers or arrangements of UEs 110, NodeBs 120, RNC 130, or MCN 140 (e.g., wireless communication network 100 may include one or more additional RNCs supporting respective sets of NodeBs, wireless communication network 100 may include one or more additional MCNs, and the like).

In 3GPP Release 6, a UE 110 with a Radio Resource Control (RRC) Connection to a NodeB 120 can be in one of the following states: CELL_DCH, CELL_FACH, CELL_PCH, or URA_PCH, where the UE 110 is put into the CELL_DCH state or the CELL_FACH state when the UE 110 is to exchange traffic with the NodeB 120 (namely, such that the UE 110 is able to transmit and receive user data) and, further, the UE 110 is put into the CELL_FACH state when the UE 110 has low burst traffic activity.

In 3GPP Release 7, the Enhanced CELL_FACH state was introduced into the UMTS/HSPA system in order to allow a UE 110 to receive High Speed Downlink Packet Access (HSDPA) packets, thereby enabling the UE 110 to receive large bursts of DL traffic. However, while introduction of the Enhanced CELL_FACH state is expected to have advantages, it also is expected to result in certain problems.

First, introduction of the Enhanced CELL_FACH state into the UMTS/HSPA system may reduce aggregate cell throughput capacity, due to the fact that the Enhanced CELL_FACH state does not support uplink Channel Quality Indicator (CQI)/Hybrid Automatic Repeat Request (HARQ) feedback from the UEs 110, thereby causing High-Speed Downlink Shared Channel (HS-DSCH) data transmission in the Enhanced CELL_FACH state to make use of estimates of the CQI parameters and the blind DL retransmission parameter. It will be appreciated that an overly conservative HS-DSCH transmission policy (e.g., an approach of using a relatively low CQI or a relatively high blind DL retransmission) would reduce the aggregate cell throughput capacity, because the HS-DSCH power and resources are shared by HSDPA UEs 110 operating in the CELL_DCH state and HSDPA UEs 110 operating in the CELL_FACH state, thereby causing an overuse of resources and, thus, resulting in less revenue for the wireless network operator.

Second, introduction of the Enhanced CELL_FACH state into the UMTS/HSPA system may reduce aggregate cell throughput capacity due to the traditional operation of the mechanism for transitioning a UE 110 from the CELL_FACH state to the CELL_DCH state. The mechanism for transitioning from the CELL_FACH state to the CELL_DCH state traditionally relies on the RLC buffer occupancy (e.g., the UE 110 is transitioned from the CELL_FACH state to the CELL_DCH state based on a determination that the RLC buffer occupancy for the UE 110 satisfies a threshold). In legacy CELL_FACH, the throughput is low, so the power of the Secondary Common Control Physical Channel (S-CCPCH), which is used to carry the FACH and the PCH, can be dimensioned so as to ensure high cell coverage with relatively minor impacts to the aggregate cell throughput capacity. In the Enhanced CELL_FACH state, however, this trigger is no longer adequate as, under bad radio conditions, a given UE 110 may not be able to send data while in the CELL_FACH state and, further, the more that the UE 110 undergoes RLC retransmission, the more the aggregate cell throughput is reduced.

Additionally, it is noted that optimization of aggregated cell throughput and signaling reliability without feedback from the UEs 110 may be quite difficult. For example, for handling of a Signaling RB (SRB) from a NodeB 120 to a UE 110, the SRB from the NodeB 120 may not reach the UE 110 if the CQI for the SRB is not set low enough, thereby resulting in degradation of one or more Key Performance Indicators (KPIs). It will be appreciated that, although a link-adaptation process may be introduced (e.g., where measured results on the Random Access Channel (RACH) may be piggybacked in uplink RRC messages from the UE 110 to the RNC 130 so that the RNC 130 can provide the measured results to the NodeB 120 with which the UE 110 is associated), the link-adaptation process is expected to be inefficient due to the relative speed at which the channel conditions of the UE 110 are changing (e.g., the measured results on the RACH may become obsolete before being used by the NodeB 120) and, further, may cause degradation of one or more KPIs (e.g., for network-initiated procedures that do not precede an uplink RRC message from the UE 110 to the RNC 130, such as a Circuit Switched (CS) Radio Access Bearer (RAB) assignment procedure or a state transition procedure for transitioning the UE 110 from the CELL_FACH state to the CELL_DCH state). On the other hand, if the CQI for the SRB of the UE 110 is too conservative (similar to the case of the CQI for the TRB for the UE 110), aggregate cell throughput degradation is expected to result. Thus, again, optimization of aggregated cell throughput and signaling reliability without feedback from the UEs 110 may be quite difficult.

Additionally, at least some of the above described problems related to introduction of the Enhanced CELL_FACH state into the UMTS/HSPA system in 3GPP Release 7 also may occur within UMTS/HSPA systems in 3GPP Release 8 and later 3GPP Releases. For a UE 110 operating in 3GPP Release 8 and later 3GPP Releases, feedback channels (e.g., providing CQI feedback, providing ACK/NACK feedback that is indicative of HARQ retransmissions, and the like) may only be available when the UE 110 maintains a common uplink E-DCH resource after collision resolution. When the UE 110 has no uplink traffic, the UE typically has to release the common uplink E-DCH resource for other users after expiration of a back-off timer. Similarly, if the DL radio condition of the UE 110 is weak, the UE 110 is unable to decode in the DL from the NodeB 120 and, thus, will not have any control frame to be sent to the RNC 130 via the uplink to the NodeB 120. As a result, it is expected that aggregate cell throughput degradation also may occur for UMTS/HSPA systems in 3GPP Release 8 and later 3GPP Releases.

It will be appreciated that retransmissions at the physical layer may or may not be blind retransmissions (e.g., where the term "blind" indicates that the retransmissions are performed without any feedback information from the UEs 110). As noted above, for example, the feedback information may be in the form of HARQ feedback or feedback associated with any other suitable physical layer protocol. For example, when there is no feedback information indicative of retransmissions in the physical layer (e.g., 3GPP Release 7 E-FACH, 3GPP Release 8 E-FACH without an uplink E-DCH, and the like), physical layer retransmissions may be referred to as blind DL retransmissions or blind physical layer retransmissions. Similarly, for example, when there is feedback information indicative of retransmission in the physical layer (e.g., HS-DSCH on CELL_DCH, HS-DSCH on Enhanced CELL_FACH with an uplink E-DCH allocated, and the like), physical layer retransmissions may be referred to as feedback-based DL retransmissions or feedback-based physical layer retransmissions. Accordingly, references herein to blind DL retransmission parameters will be understood to include parameters which may be used for downlink retransmissions at the physical layer for UEs 110 from which physical layer retransmission feedback information is unavailable (e.g., UEs 110 operating according to 3GPP Release 7, UEs 110 operating according to 3GPP Release 8 where feedback information is unavailable, and the like).

As described herein, various embodiments of the wireless transmission control capability are configured to improve (and, in at least some cases, maximize) aggregate cell throughout capacity and signaling reliability for various types of wireless communication systems supporting the Enhanced CELL_FACH state (e.g., UMTS/HSPA systems supporting 3GPP Release 7, UMTS/HSPA systems supporting 3GPP Release 8 and later, and the like, as well as various combinations thereof) or similar states. As described herein, at least some such embodiments of the wireless transmission control capability may be provided by WTCMs 150 of wireless communication system 100.

The WTCMs 150 may be configured to support various embodiments of the wireless transmission control capability. For example, a WTCM 150 may be configured to provide one or more of a capability for determining default DL channel operating parameter information (e.g., one or more default CQI values, a value of a default number of blind DL retransmissions, and the like) for a set of cells of a set of wireless access devices (e.g., one or more cells of one or more NodeBs 120) based on DL channel operating parameter distribution information associated with the set of cells of the set of wireless access devices, a capability for determining DL channel operating parameter information (e.g., one or more CQI values, a value of a number of blind DL retransmissions, and the like) of a WUD (e.g., of a UE 110) based on RLL retransmission information associated with the WUD, a capability for forcing a WUD (e.g., a UE 110) to transition from a first WUD state (e.g., a CELL_FACH state) to a second WUD state (e.g., a CELL_DCH state) based on RLL retransmission information associated with the WUD (and, optionally, based on information associated with the WUD), and the like, as well as various combinations thereof. Various embodiments of such capabilities are described in additional detail hereinbelow with respect to FIG. 2-FIG. 5.

In at least some embodiments, a capability is provided for determining default DL channel operating parameter information for a set of cells of a set of wireless access devices. The set of wireless access devices may include one or more wireless access devices of a wireless communication network. The set of cells may include one or more cells of one or more wireless access devices of a wireless communication network.

In at least some embodiments, a WTCM 150 is configured to determine default DL channel operating parameter information for a set of cells of a set of NodeBs 120. The set of cells may include one or more cells of one or more NodeBs 120 (e.g., one cell of a given NodeB 120, multiple cells of a given NodeB 120, one cell of a first NodeB 120 and one cell of a second NodeB 120, and the like).

In at least some embodiments, default DL channel operating parameter information for a set of cells of a set of wireless access devices is determined by receiving DL channel operating parameter information for the set of cells, determining DL channel operating parameter distribution information based on the DL channel operating parameter information, and determining default DL channel operating parameter information based on the DL channel operating parameter distribution information.

The DL channel operating parameter information for the set of cells may include DL channel status information indicative of the status of DL channels associated with UEs 110 associated with the cell(s) in the set of cell(s). The information indicative of the status of a DL channel of a UE 110 may include information indicative of the quality level of the DL channel (e.g., CQI values reported by the UE 110), information indicative of the quality of reception on the DL channel by the UE 110 (e.g., physical layer retransmission information indicative of requests by UEs 110 for retransmissions at the physical layer), and the like, as well as various combinations thereof. The DL channel operating parameter information may include one or more of CQI information (e.g., CQI values) reported by UEs 110, physical layer retransmission information indicative of requests by UEs 110 for retransmissions at the physical layer (e.g., acknowledgments (ACKs), negative acknowledgments (NACKs), and the like), and the like, as well as various combinations thereof. The physical layer retransmission information indicative of requests by UEs 110 for retransmissions at the physical layer may include HARQ feedback information from the UEs 110 or feedback information associated with any other suitable physical layer protocol supporting retransmissions at the physical layer. The DL channel operating parameter information for a UE 110 served by a cell in the set of cells may be reported by the UE 110 via a UL channel from the UE 110 to the NodeB 120. The DL channel operating parameter information of a UE 110 may be reported by the UE 110 when the UE 110 is in the CELL_DCH state, or under certain conditions when the UE 110 is in the Enhanced CELL_FACH state (e.g., when the UE 110 is operating in 3GPP Release 8 while an uplink is allocated, when the UE is operating in a later 3GPP Release that supports reporting of DL channel feedback information while the UE 110 is in the Enhanced CELL_FACH state, and the like). As described herein, however, such DL channel operating parameter information is not expected to be available from UEs 110 associated with the cell(s) in the set of cells when the UEs 110 are operating in 3GPP Release 7, when the UEs 110 are operating in 3GPP Release 8 but do not have an uplink allocated (e.g., UL Common E-DCH), and possibly under other conditions in which UEs 110 may operate. Thus, it is expected that, in most cases, DL channel operating parameter information will only be received from a subset of the UEs 110 associated with the cell(s) in the set of cells. Accordingly, a capability may be provided for determining default DL channel operating parameter information which may be used by any UEs 110 associated with the cell(s) in the set of cells even when DL channel operating parameter information is available only from a subset of the UEs 110 associated with the cell(s) in the set of cells. The DL channel operating parameter information for the set of cells may be maintained on a per RB basis (e.g., for one or more RBs of the UEs 110 from which DL channel operating parameter information is received), on a per UE basis, on a per cell basis (e.g., for each cell in the set of cells), as aggregate information for the set of cells, and the like, as well as various combinations thereof.

The DL channel operating parameter information may include, or may be processed to determine, information for use in determining the DL channel operating parameter distribution information. For example, for a given UE 110 for which DL channel operating parameter information is received, the DL channel operating parameter information may include the times at which the CQI values are reported by the UE 110 (e.g., for use in determining time-varying CQI distribution information), the cell(s) with which the UE 110 is associated when the CQI values are reported by the UE 110 (e.g., for use in determining geographically-varying CQI distribution information), and the like. For example, for a given UE 110 for which DL channel operating parameter information is received, the DL channel operating parameter information may include the times at which the physical layer retransmissions are requested by the UE 110 (e.g., for use in determining time-varying physical layer retransmission distribution information), the cell(s) with which the UE 110 is associated when the physical layer retransmissions are requested (e.g., for use in determining geographically-varying physical layer retransmission distribution information), and the like. It will be appreciated that the DL channel operating parameter information may be processed to provide various type of intermediate information which may be used in determining the DL channel operating parameter distribution information.

The DL channel operating parameter distribution information is determined based on the DL channel operating parameter information. The DL channel operating parameter distribution information may include time-varying DL channel operating parameter distribution information, geographically-varying DL channel operating parameter distribution information, and the like, as well as various combinations thereof (which may be dependent on the scope of the set of cells and, thus, the scope of the set of UEs 110, with which the DL channel operating parameter information is associated). In at least some embodiments, the determination of DL channel operating parameter distribution information based on DL channel operating parameter information may include determining information associated with a statistical model of the DL channel operating parameter information (e.g., an average of values included in the DL channel operating parameter information, a standard deviation of values included in the DL channel operating parameter information, and the like). For example, where the DL channel operating parameter information includes CQI values reported by UEs 110, the determination of DL channel operating parameter distribution information may include determining CQI distribution information associated with a statistical model of the CQI values (e.g., one or more of an average of the CQI values, a weighted average of the CQI values (e.g., with more recently received CQI values being weighted higher than less recently received CQI values or using any other suitable basis for weighting), a standard deviation of the CQI values, and the like). For example, where the DL channel operating parameter information includes physical layer retransmission information indicative of physical layer retransmissions requested by UEs 110 at the physical layer, the determination of DL channel operating parameter distribution information may include determining physical layer retransmission distribution information associated with a statistical model of the physical layer retransmission information (e.g., one or more of an average of the number of physical layer retransmissions, a standard deviation of the number of physical layer retransmissions, and the like).

The default DL channel operating parameter information is determined based on the DL channel operating parameter distribution information. The default DL channel operating parameter information may be determined based on the DL channel operating parameter distribution information and a target associated with the set of cells for which the default DL channel operating parameter information is determined.

In at least some embodiments, the determination of default DL channel operating parameter information based on a target associated with the set of cells may include selecting default DL channel operating parameter information based on a target percentage of UEs 110 to be covered by the set of cells, a target of favoring reliability over cell throughput capacity (e.g., for an SRB), a target of favoring cell throughput capacity over reliability (e.g., for a TRB), a target of providing a tradeoff between two or more performance indicators (e.g., latency, reliability, throughput, and the like), and the like, as well as various combinations thereof.

In at least some embodiments, determination of the default DL channel operating parameter information includes determining at least one default DL channel operating parameter (e.g., at least one of a default CQI value and a default number of blind DL retransmissions) based on at DL channel operating parameter distribution information (e.g., at least one of CQI distribution information and physical layer retransmission distribution information). In at least some embodiments, determination of the default DL channel operating parameter information includes determining a default CQI value based on CQI distribution information. In at least some embodiments, determination of the default DL channel operating parameter information includes determining a default CQI value based on CQI distribution information and physical layer retransmission distribution information. In at least some embodiments, determination of the default DL channel operating parameter information includes setting a desired value of a number of blind DL retransmissions and determining a default CQI value based on at least one of CQI distribution information and physical layer retransmission distribution information while maintaining the desired value of the number of blind DL retransmissions. In at least some embodiments, determination of the default DL channel operating parameter information includes determining a value of a default number of blind DL retransmissions based on physical layer retransmission distribution information. In at least some embodiments, determination of the default DL channel operating parameter information includes determining a value of a default number of blind DL retransmissions based on CQI distribution information and physical layer retransmission distribution information. In at least some embodiments, determination of the default DL channel operating parameter information includes setting a desired CQI value and determining a value of a default number of blind DL retransmissions based on at least one of physical layer retransmission distribution information and CQI distribution information while maintaining the desired CQI value.

In at least some embodiments, determination of the default DL channel operating parameter information includes determining a set of default DL channel operating parameters to be used at different times based on time-varying DL channel operating parameter distribution information. For example, multiple default CQI values may be determined for use by the cell(s) in the set of cells at different times (e.g., different times of day, different days of the week, and the like). For example, multiple values for the default number of blind DL retransmissions may be determined for use by the cell(s) in the set of cells at different times (e.g., different times of day, different days of the week, and the like).

In at least some embodiments, determination of the default DL channel operating parameter information includes determining a set of default DL channel operating parameters to be used by different cells in the set of cells based on geographically-varying DL channel operating parameter distribution information in which variations in geography may be based on the geographic regions covered by the respective cells in the set of cells. For example, multiple default CQI values may be determined for use by different cells in the set of cells. For example, multiple values for the default number of blind DL retransmissions may be determined for use by different cells in the set of cells.

In at least some embodiments, determination of the default DL channel operating parameter information includes determining a set of default DL channel operating parameters to be used at different times by different cells in the set of cells based on time-and-geographically-varying DL channel operating parameter distribution information in which variations in time may be at any suitable scale and variations in geography may be based on the geographic regions covered by the respective cells in the set of cells. For example, multiple default CQI values may be determined for multiple combinations of times and cells in the set of cells. For example, multiple values for the default number of blind DL retransmissions may be determined for multiple combinations of times and cells in the set of cells.

The default DL channel operating parameter information may be used by a UE 110 (1) when the UE 110 is incapable of DL channel operating parameter information (e.g., the UE 110 is operating in a 3GPP Release that does not support feedback of DL channel operating parameter information or the UE 110 is operating in a mode in which feedback of DL channel operating parameter information cannot be provided), (2) when the UE 110 is capable of providing DL channel operating parameter information, but has not yet provided DL channel operating parameter information, or (3) when DL channel operating parameter information has been received from the UE 110, but the DL channel operating parameter information received from the UE 110 is determined to be invalid. With respect to (1), it will be appreciated that the UE 110 may be incapable of providing DL channel operating parameter information when the UE is operating using 3GPP Release 7 or an earlier 3GPP Release, when the UE is operating using 3GPP Release 8 or a later 3GPP Release and the UE 110 does not have a UL via which DL channel operating parameter information may be reported (e.g., when the UE 110 has an E-FACH without an uplink E-DCH), and the like. With respect to (2), it will be appreciated that, while the UE 110 may be capable of providing DL channel operating parameter information, the UE 110 may not have provided DL channel operating parameter information, because the UE 110 may still be trying to successfully acquire an uplink feedback channel such that the UE 110 may provide DL channel operating parameter information. With respect to (3), it will be appreciated that validity of DL channel operating parameter information for UE 110 may be based on the type of the DL channel operating parameter information received (e.g., "fast" feedback via the UL channel of the UE 110 or "slow" feedback information received via RRC or similar signaling messages from the UE 110) or the age of the DL channel operating parameter information received (e.g., based on whether a difference between a current time and a time at which the last set of DL channel operating parameter information was received from the UE 110 exceeds a threshold). In other words, the default DL channel operating parameter information may be used by a UE 110 in the absence of valid derived DL channel operating parameter information for the UE 110, where the derived DL channel operating parameter information for a UE is UE-specific DL channel operating parameter information that is derived from valid DL channel operating parameter information received as feedback from the UE 110.

As described herein, the DL channel operating parameter information may include received CQI values, the DL channel operating parameter distribution information may include CQI distribution information, and the default DL channel operating parameter information may include one or more default CQI values. In at least some embodiments, the CQI values may include at least one of SRB CQI values or TRB CQI values. For example, when the received CQI values include SRB CQI values, the CQI distribution information may include SRB CQI distribution information and, similarly, the default CQI information may include a default SRB CQI value(s) determined based on the SRB CQI distribution information. Similarly, for example, when the received CQI values include TRB CQI values, the CQI distribution information may include TRB CQI distribution information and, similarly, the default CQI information may include a default TRB CQI value(s) determined based on the TRB CQI distribution information. For example, when the received CQI values include SRB CQI values and TRB CQI values, the SRB CQI values and TRB CQI values may be processed independently in order to determine a default SRB CQI value and a default TRB CQI value, respectively. It will be appreciated that SRB CQI values and TRB CQI values may be processed in various other ways.

In at least some embodiments, a NodeB 120 monitors DL channel operating parameter information (e.g., reported CQI values, information indicative of requests for physical layer retransmissions, and the like) for some or all of the UEs 110 in a given cell of the NodeB 120 over a set of time intervals (e.g., different time intervals of a given day, different time intervals of different days, and the like), determines time-varying DL channel operating parameter distribution information (e.g., time-varying CQI distribution information, time-varying physical layer retransmission distribution information, and the like) for the given cell of the NodeB 120 based on the DL channel operating parameter information, and determines default DL channel operating parameter information (e.g., default CQI information, default blind DL retransmission information, and the like) for the given cell of the NodeB 120 based on the time-varying DL channel operating parameter distribution information for the given cell of the NodeB 120. The default DL channel operating parameter information may then be used for the UEs 110 accessing that cell of the NodeB 120.

In at least some embodiments, a NodeB 120 monitors DL channel operating parameter information (e.g., reported CQI values, information indicative of requests for physical layer retransmissions, and the like) received from some or all of the UEs 110 in a set of cells of the NodeB 120 (e.g., two or more of the cells of the NodeB 120), determines geographically-varying DL channel operating parameter distribution information (e.g., CQI distribution information, physical layer retransmission distribution information, and the like) for the set of cells of the NodeB 120 based on the DL channel operating parameter information (e.g., based on the different geographic regions covered by the cells of the set of cells of the NodeB 120), and determines default DL channel operating parameter information (e.g., default CQI information, default blind DL retransmission information, and the like) for the set of cells of the NodeB 120 based on the geographically-varying DL channel operating parameter distribution information for the set of cells of the NodeB 120. The default DL channel operating parameter information may then be used for the UEs 110 accessing any of the cells in the set of cells of the NodeB 120.

In at least some embodiments, a NodeB 120 monitors DL channel operating parameter information (e.g., reported CQI values, information indicative of requests for physical layer retransmissions, and the like) received from some or all of the UEs 110 in a set of cells of the NodeB 120 (e.g., some or all of the cells of the NodeB 120), determines time-and-geographically-varying DL channel operating parameter distribution information (e.g., CQI distribution information, physical layer retransmission distribution information, and the like) for the set of cells of the NodeB 120 based on the DL channel operating parameter information (e.g., for different time intervals over the different geographic regions covered by the cells of the set of cells of the NodeB 120, and determines default DL channel operating parameter information (e.g., default CQI information, default blind DL retransmission information, and the like) for the set of cells of the NodeB 120 based on the time-and-geographically-varying DL channel operating parameter distribution information for the set of cells of the NodeB 120. The default DL channel operating parameter information may then be used for the UEs 110 accessing any cells in the set of cells of the NodeB 120.

It will be appreciated that, although primarily depicted and described with respect to embodiments in which determination of the DL channel operating parameter distribution information and determination of the default DL channel operating parameter information is performed by a NodeB 120, in at least some embodiments these functions may be distributed across elements of wireless communication system 100 in other ways. In at least some embodiments, for example, the DL channel operating parameter distribution information for a cell(s) of a NodeB 120 may be determined by RNC 130 and reported by RNC 130 to the NodeB 120 for use by the NodeB 120 to determine the default DL channel operating parameter information for the cell(s) of the NodeB 120. In at least some embodiments, the DL channel operating parameter distribution information and the default DL channel operating parameter information for a cell(s) of a NodeB 120 may be determined by the RNC 130 and provided from the RNC 130 to the NodeB 120 for use by the NodeB 120 to determine the default DL channel operating parameter information for use by UEs 110 of the cell(s) of the NodeB 120.

Figure 2:
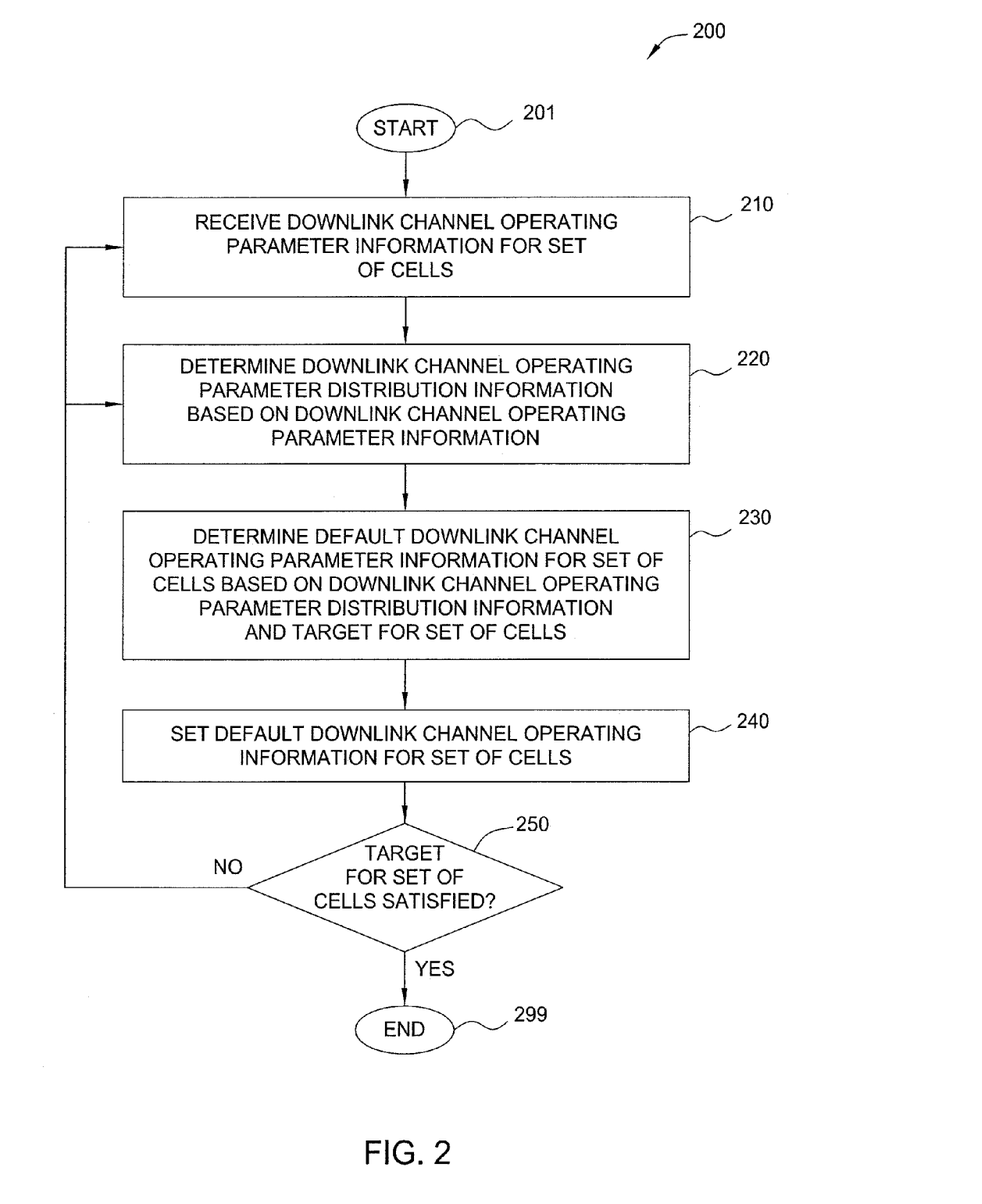
FIG. 2 depicts one embodiment of a method for determining default downlink channel operating parameter information for a set of cells of a wireless communication system.

FIG. 2 depicts one embodiment of a method for determining default downlink channel operating parameter information for a set of cells of a wireless communication system. The set of cells may include one or more cells of one or more wireless access devices. It will be appreciated that, although primarily depicted and described as being performed serially, at least a portion of the steps of method 200 may be performed contemporaneously or in a different order than presented in FIG. 2.

At step 201, method 200 begins.

At step 210, DL channel operating parameter information is received. The DL channel operating parameter information is expected to be received from only a portion of the WUDs in the set of cells. The DL channel operating parameter information may include CQI values reported by WUDs, physical layer retransmission information indicative of physical layer retransmissions requested by WUDs (e.g., information indicative of requests for retransmissions based on HARQ or any other physical layer protocol supporting retransmissions at the physical layer), and the like.

At step 220, DL channel operating parameter distribution information is determined based on the DL channel operating parameter information. For example, CQI distribution information may be determined based on CQI values reported by WUDs, physical layer retransmission distribution information may be determined based on the information indicative of physical layer retransmissions requested by WUDs, and the like.

At step 230, default DL channel operating parameter information is determined based on the DL channel operating parameter distribution information and a target for the set of cells. The default DL channel operating parameter information may be used by WUDs in the set of cells from which DL channel status information will not be received via ULs from the WUDs (e.g., the default information may be used by the WUDs for as long as they are associated with one of the cells in the set of cells), WUDs in the set of cells from which DL channel status information will be received via ULs from the WUDs but from which the DL channel status information has not yet been received (e.g., the default information may be used in the interim between the time at which the WUD acquires a DL channel and the time at which the WUD acquires an UL channel via which DL channel status information for use in determining DL channel operating parameter information that is specific to the WUD based on the DL channel status information received from the WUD), WUDs in the set of cells from which DL channel status information has been received but for which the DL channel status information that has been received is out of date (e.g., based on an age threshold), and the like, as well as various combinations thereof. For example, the default DL channel operating parameter information may include one or more default CQI values determined based on CQI distribution information and the target for the set of cells, one or more values of a default number of blind DL retransmissions determined based on physical layer retransmission distribution information and the target for the set of cells, and the like. For example, the target for the set of cells may include a target percentage of WUDs to be covered by the cells in the set of cells, a reliability target in which reliability is favored over cell throughput capacity for SRB, a target of favoring throughput over reliability for TRB, and the like.

At step 240, the default DL channel operating parameter information is set for the set of cells. The default DL channel operating parameter information may be set on the one or more wireless access devices supporting the one or more cells in the set of cells.

At step 250, a determination is made as to whether the target for the set of cells has been satisfied via use of the default DL channel operating parameter information. If the target for the set of cells has not been satisfied, method 200 returns either to step 210 (e.g., if new DL channel operating parameter information is available for processing) or step 220 (e.g., if new DL channel operating parameter information is not available for processing). If the target for the set of cells has been satisfied, method 200 proceeds to step 299, where method 200 ends.

At step 299, method 200 ends.

It will be appreciated that, although primarily depicted and described herein with respect to embodiments in which physical layer retransmission information is used to determine default DL channel operating parameter information (e.g., using physical layer retransmission information indicative of requests by WUDs for retransmissions at the physical layer to determine physical layer retransmission distribution information and using the physical layer retransmission distribution information to determine default DL channel operating parameter information), in at least some embodiments retransmission information associated with one or more layers other than the physical layer may be used (in addition to or in place of the retransmission information associated with the physical layer) to determine default DL channel operating parameter information. For example, retransmissions at the data link layer (e.g., based on the RLC protocol or any other suitable RLL protocol), the network layer, the transport layer, and the like, may be used to determine default DL channel operating parameter information.

In at least some embodiments, a capability is provided for adjusting a DL channel operating parameter of a WUD based on RLL retransmission information associated with the WUD.

In at least some embodiments, a WTCM 150 is configured to adjust a DL channel operating parameter of a UE 110 based on RLL retransmission information associated with the UE 110.

In at least some embodiments, RLL retransmissions requested by a UE 110 are monitored to determine RLL retransmission information associated with the UE 110 and a determination is made, based on the RLL retransmission information associated with the UE 110, as to whether or not to adjust a DL channel operating parameter of the UE 110. It will be appreciated that RLL retransmissions may be controlled by any suitable RLL protocol (e.g., the RLC protocol and the like). In at least some embodiments, monitoring of RLL retransmissions requested by a UE 110 may be performed by monitoring the RLL protocol (e.g., the RLC protocol and the like) via which the UE 110 requests retransmissions at the RLL.

In at least some embodiments, the monitoring of RLL retransmissions and the associated RLL retransmission information may be provided at any suitable level of granularity (e.g., for a specific RB of the UE 110, for a set of RBs (e.g., some or all of the RBs) of the UE 110, for the UE 110, and the like.

The monitoring of RLL retransmissions may be based on the level of granularity at which the monitoring of RLL retransmissions and the associated RLL retransmission information is provided. In at least some embodiments, monitoring of RLL retransmissions for an RB of a UE 110 may be based on an identifier of the UE 110 (e.g., the dedicated HSDPA-Radio Network Temporary Identity (H-RNTI) allocated for the UE 110 when in the Enhanced CELL_FACH state). In at least some embodiments, monitoring of RLL retransmissions for an RB of a UE 110 may be based on an identifier of the UE 110 and logical channel information associated with the UE 110. In at least some embodiments, monitoring of RLL retransmissions for an RB of a UE 110 may be based on an identifier of the UE 110, logical channel information associated with the UE 110, and RLC Sequence Number (SN) information (or other similar sequence number information where a different RLL protocol is used) associated with the RB of the UE 110.

The RLL retransmission information associated with the UE 110 may include a count of the number of RLL retransmissions for a specific RB of the UE 110, a count of a number of RLL retransmissions for a set of RBs of the UE 110 (e.g., some or all of the RBs) of the UE 110, a count of the number of RLL retransmissions requested by the UE 110, a RLL retransmission rate for a specific RB of the UE 110 over a period of time, a RLL retransmission rate for a set of RBs of the UE 110 (e.g., some or all of the RBs) of the UE 110 over a period of time, a RLL retransmission rate for the UE 110 over a period of time, and the like, as well as various combinations thereof. In at least some embodiments, the determination as to whether or not to adjust a DL channel operating parameter for the RB of the UE 110 may be based on one or more thresholds associated with one or more types of RLL retransmission information associated with the UE 110 (e.g., based on one or more of a determination that a number of RLL retransmissions satisfies a threshold, a determination that a rate of RLL retransmissions satisfies a threshold, and the like).

The DL channel operating parameter of the UE 110 that is to be adjusted may include a CQI value of the UE 110 (e.g., an SRB CQI value or a TRB CQI value), a value of a number of blind DL retransmissions for the UE 110, and the like.

In at least some embodiments, based on a determination that a DL channel operating parameter of the UE 110 is to be adjusted, a new value of the DL channel operating parameter of the UE 110 is determined. The new value of the DL channel operating parameter of the UE 110 may be determined in any suitable manner (e.g., based on predetermined increment/decrement values, based on a look-up table (e.g., where the number of RLL retransmissions is used as a key into the look-up table to determine a new CQI value to be used, where the number of RLL retransmissions is used as a key into the look-up table to determine a new value of the number of blind DL retransmissions to be used, where a rate of RLL retransmissions is used as a key into the look-up table to determine a new value of the number of blind DL retransmissions to be used, and the like).

In at least some embodiments, the determination as to whether or not a DL channel operating parameter of the UE 110 is to be adjusted may be performed by the NodeB 120 supporting the UE 110, such that the NodeB 120 has an indication as to whether or not a DL channel operating parameter of the UE 110 is to be adjusted. The NodeB 120, based on an indication that the DL channel operating parameter of the UE 110 is to be adjusted, may then determine the new value of the DL channel operating parameter for the UE 110 (e.g., via use of a look-up table to determine the new value of the DL channel operating parameter for the UE 110, by incrementing or decrementing the existing value of the DL channel operating parameter for the UE 110, and the like).

In at least some embodiments, the determination as to whether or not a DL channel operating parameter of the UE 110 is to be adjusted may be performed by the RNC 130 that is supporting the NodeB 120 that is supporting the UE 110. The RNC 130, based on a determination that a DL channel operating parameter of the UE 110 is to be adjusted, may (1) provide an indication to the NodeB 120 that a DL channel operating parameter of the UE 110 is to be adjusted (in which case the NodeB 120 may determine the new value of the DL channel operating parameter of the UE 110), (2) determine information for use by the NodeB 120 to adjust the value of the DL channel operating parameter and provide the information for use by the NodeB 120 to adjust the value of the DL channel operating parameter to the NodeB 120 (in which case the NodeB 120 determines the new value of the DL channel operating parameter of the UE 110 based on the information for use by the NodeB 120 to adjust the value of the DL channel operating parameter), or (3) determine the new value of the DL channel operating parameter on behalf of the NodeB 120 and provide the new value of the DL channel operating parameter to the NodeB 120. In such embodiments, the information that is communicated from the RNC 130 to the NodeB 120 (e.g., an indication that a DL channel operating parameter of the UE 110 is to be adjusted, information for use by the NodeB 120 to adjust the value of the DL channel operating parameter, the new value of the DL channel operating parameter to be used, and the like) may be communicated from the RNC 130 to the NodeB 120 in any suitable manner. For example, the information that is communicated from the RNC 130 to the NodeB 120 may be sent via the I-ub HS-DSCH FP of the RB of the UE 110.

Figure 3:
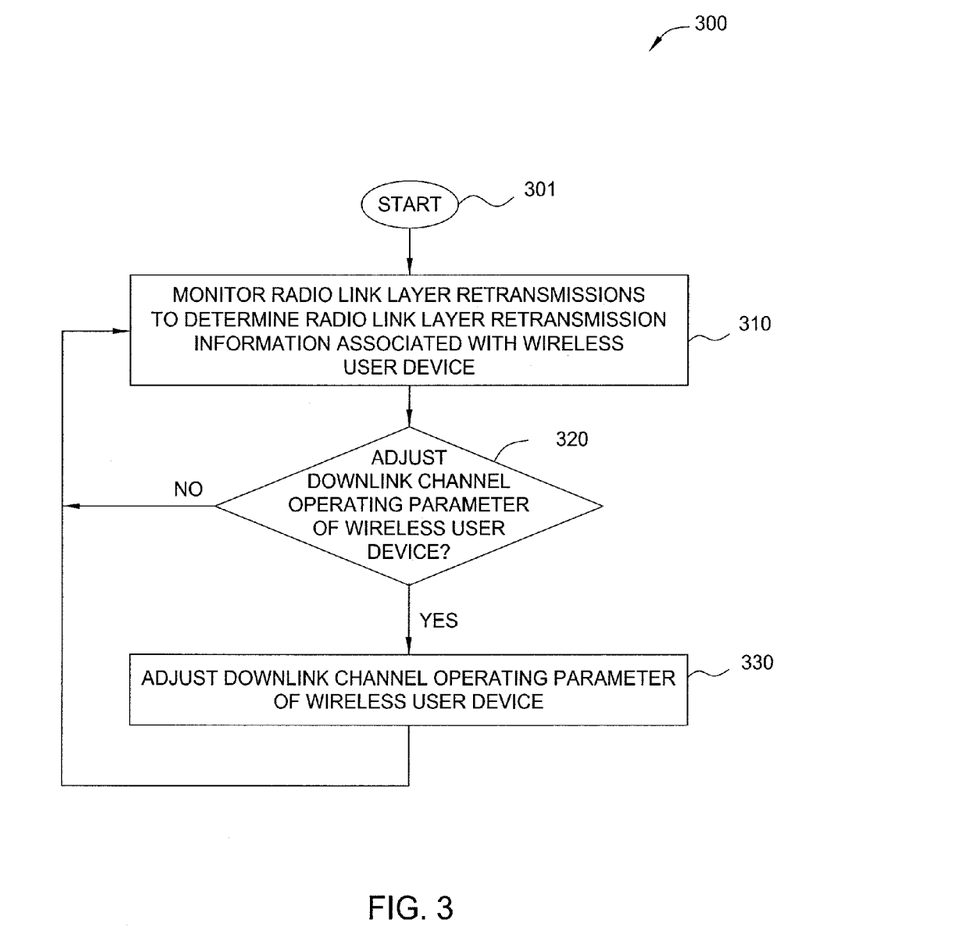
FIG. 3 depicts one embodiment of a method for adjusting a downlink channel operating parameter of a wireless user device based on radio link layer retransmission information associated with the wireless user device.

FIG. 3 depicts one embodiment of a method for adjusting a downlink channel operating parameter of wireless user device based on radio link layer retransmission information associated with the wireless user device. It will be appreciated that, although primarily depicted and described as being performed serially, at least a portion of the steps of method 300 may be performed contemporaneously or in a different order than presented in FIG. 3.

At step 301, method 300 begins.

At step 310, RLL retransmissions requested by a WUD are monitored to determine RLL retransmission information associated with the WUD. The RLL retransmission information may include a number of RLL retransmissions to the WUD, a rate of RLL retransmissions to the WUD, and the like.

At step 320, a determination is made, based on the RLL retransmission information associated with the WUD, as to whether or not to adjust a DL channel operating parameter of the WUD. If a determination is made not to adjust a DL channel operating parameter of the user device, method 300 returns to step 310 such that monitoring of RLL retransmissions requested by the WUD may continue. If a determination is made to adjust a DL channel operating parameter of the WUD, method 300 proceeds to step 330.

At step 330, the DL channel operating parameter of the WUD is adjusted. From step 330, method 300 returns to step 310 such that monitoring of RLL retransmissions requested by the WUD may continue.

It will be appreciated that, although omitted for purposes of clarity, method 300 may end under various conditions, such as in response to a determination that no further adjustments of the DL channel operating parameter are required, when one or more of the RBs of the WUD have been terminated, and the like.

It will be appreciated that, although primarily presented with respect to embodiments in which a single DL channel operating parameter of the WUD is adjusted based on RLL retransmission information of the WUD, in at least some embodiments multiple DL channel operating parameters of the WUD may be adjusted based on RLL retransmission information associated with the WUD. In at least some such embodiments, the adjustments for multiple DL channel operating parameters of the WUD may be controlled using the same criteria (e.g., adjustments to multiple DL channel operating parameters of the WUD are evaluated based on a single threshold number of RLL retransmissions) or different criteria (e.g., adjustments to multiple DL channel operating parameters of the WUD may be evaluated based on different threshold numbers of RLL retransmissions for the different DL channel operating parameters).

In at least some embodiments, a capability is provided for forcing a WUD to transition from a first WUD state (e.g., a CELL_FACH state) to a second WUD state (e.g., a CELL_DCH state) based on RLL retransmission information associated with the WUD and, optionally, based on WUD information associated with the WUD. In at least some embodiments, a WTCM 150 is configured to force a UE 110 to transition from a first WUD state (e.g., CELL_FACH state) to a second WUD state (e.g., CELL_DCH state) based on RLL retransmission information associated with the UE 110 and, optionally, based on WUD information associated with the UE 110.

The transition of the WUD from the CELL_FACH state to the CELL_DCH state is considered to be forced in that the transition is triggered before a condition that normally would trigger the WUD to transition from the CELL_FACH state to the CELL_DCH state (e.g., before the RLL buffer occupancy is reached) or before a higher-layer retransmission (e.g., a TCP retransmission or other suitable type of retransmission) which causes traffic for the WUD to exceed a threshold that normally would trigger the WUD to transition from the CELL_FACH state to the CELL_DCH state.

The forced transition of WUDs of a cell from the CELL_FACH state to the CELL_DCH state enables improvements in (and possibly even optimization of) the aggregate cell throughput capacity of the cell.

The RLL retransmission information associated with the UE 110 may include a count of the number of RLL retransmissions requested by the UE 110 for a specific RB of the UE 110, a count of a number of RLL retransmissions requested by the UE 110 for a set of RBs (e.g., some or all of the RBs) of the UE 110, a count of the number of RLL retransmissions requested by the UE 110, a RLL retransmission rate for a specific RB of the UE 110 over a period of time, a RLL retransmission rate for a set of RBs (e.g., some or all of the RBs) of the UE 110 over a period of time, a RLL retransmission rate for the UE 110 over a period of time, and the like, as well as various combinations thereof.

The UE information associated with the UE 110 may include a type or category of the UE 110 (e.g., a release number of the UE 110, such as the UE 110 being a 3GPP Release 7 device, a 3GPP Release 8 device, and the like), a combination of a type or category of the UE 110 and uplink traffic information associated with the UE 110 (e.g., the UE 110 is a 3GPP Release 8 device, but there has been no uplink traffic for the UE 110 for a given period of time such that it may be assumed that the associated NodeB 120 that is supporting the UE 110 is operating in a blind mode toward the UE 110), and the like.

The transition of the UE 110 from the CELL_FACH state to the CELL_DCH state may be identified and triggered by the NodeB 120 that is supporting the UE 110, or the transition of the UE 110 from the CELL_FACH state to the CELL_DCH state may be identified by the RNC 130 that is supporting the NodeB 120 that is supporting the UE 110 and an indication of the transition of the UE 110 from the CELL_FACH state to the CELL_DCH state may be communicated from the RNC 130 to the NodeB 120 for use by the NodeB 120 to trigger the transition of the UE 110 from the CELL_FACH state to the CELL_DCH state. The NodeB 120 may trigger the transition of the UE 110 from the CELL_FACH state to the CELL_DCH state by sending a state transition command to the UE 110. It will be appreciated that, since the default CQI for SRB and the default CQI for TRB are expected to be different, the NodeB 120 is expected to be able to transmit the state transition command to the UE 110 via the SRB even if the NodeB 120 is unable to transmit successfully to the UE 110 on the TRB.

It will be appreciated that, although primarily depicted and described herein with respect to embodiments in which the first WUD state is a CELL_FACH state and the second WUD state is a CELL_DCH state, the forced transition of the WUD may be a forced transition between any other suitable WUD states.

Figure 4:
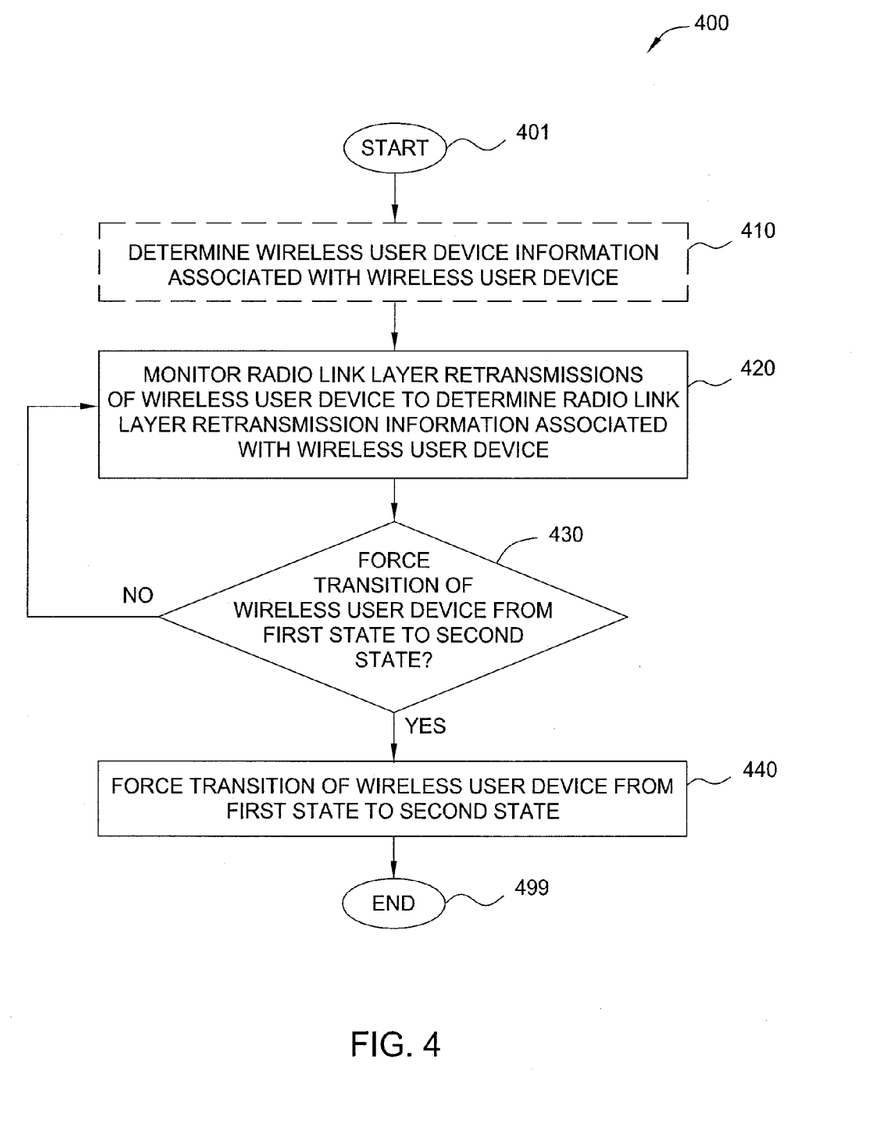
FIG. 4 depicts one embodiment of a method for forcing a wireless user device to transition from a first wireless user device state to a second wireless user device state based on radio link layer retransmission information associated with the wireless user device.

FIG. 4 depicts one embodiment of a method for forcing a wireless user device to transition from a first wireless user device state to a second wireless user device state based on radio link layer retransmission information associated with the wireless user device. It will be appreciated that, although primarily depicted and described as being performed serially, at least a portion of the steps of method 400 may be performed contemporaneously or in a different order than presented in FIG. 4.

At step 401, method 400 begins.

At step 410 (an optional step), WUD information associated with the WUD is determined.

At step 420, RLL retransmissions requested by the WUD are monitored in order to determine RLL retransmission information for the WUD. The monitoring of RLL retransmissions requested by the WUD may be performed at any suitable level of granularity (e.g., for an individual RB of the WUD, for a subset of the RBs of the WUD, for the WUD, and the like).

At step 430, a determination is made, based on the RLL retransmission information (and, optionally, based on the WUD information), as to whether or not to force the WUD to transition from the first WUD state to the second WUD state. If a determination is made not to force the WUD to transition from the first WUD state to the second WUD state, method 400 returns to step 420 such that monitoring of RLL retransmissions requested by the WUD may continue. If a determination is made to force the WUD to transition from the first WUD state to the second WUD state, method 400 proceeds to step 440.

At step 440, a forced transition of the WUD from the first WUD state to the second WUD state is initiated. When method 400 is executed by a wireless access device (e.g., a NodeB), the forced transition of the WUD from the first WUD state to the second WUD state may be initiated by propagating, from the wireless access device toward the WUD, a state transition command configured for forcing the WUD to transition from the first WUD state to the second WUD state. When method 400 is executed by a radio network controller (e.g., an RNC), the forced transition of the WUD from the first WUD state to the second WUD state may be initiated by propagating, from the radio network controller toward a wireless access device serving the WUD, a state transition command configured for instructing the wireless access device to propagate a state transition command toward the WUD for forcing the WUD to transition from the first WUD state to the second WUD state. From step 440, method 400 proceeds to step 499.

At step 499, method 400 ends.

In at least some embodiments, a capability is provided for modifying at least one attribute of a WUD based on RLL retransmission information associated with the WUD, where the at least one attribute of the WUD may include one or more of a DL channel operating parameter of the WUD (e.g., a CQI parameter, a blind DL retransmission parameter, and the like), a state of the WUD (e.g., a forced transition from a first state to a second state), and the like, as well as various combinations thereof. Thus, it will be appreciated that various embodiments of the capability for adjusting a DL channel operating parameter of a WUD based on RLL retransmission information associated with the WUD and the capability for forcing a WUD to transition from a first WUD state to a second WUD state based on RLL retransmission information associated with the WUD may be covered by embodiments for modifying at least one attribute of a WUD based on RLL retransmission information associated with the WUD.

It will be appreciated that, although primarily depicted and described herein with respect to embodiments in which at least one attribute of a WUD is modified based on RLL retransmission information associated with the WUD, in at least some embodiments at least one attribute of a WUD may be modified based on retransmission information associated with one or more other communication layers above the RLL (e.g., based on one or more of information indicative of retransmissions for the WUD at the network layer, information indicative of retransmissions for the WUD at the transport layer, and the like, as well as various combinations thereof). Thus, in at least some embodiments, for a given WUD, retransmission information that is at or above the data link layer may be used to modify at least one attribute for the WUD (e.g., one or more of a DL channel operating parameter of the WUD (e.g., a CQI parameter, a blind DL retransmission parameter, and the like), a state of the WUD (e.g., a forced transition from a first state to a second state), and the like, as well as various combinations thereof).

In at least some embodiments, various combinations of capabilities presented herein may be supported by one or more WTCMs 150. The initial CQI for the UE 110 may set based on measurement results on RACH for the UE 110. As RLC retransmission occurs for the UE 110, the NodeB 120 (based on local determinations and/or information received from an associated RNC 130) reduces the CQI of the RB of the UE 110 (e.g., by decrementing the CQI of the UE 110). As RLC retransmission worsens (e.g., RLC retransmission for the RB of the UE 110 persists despite a threshold number of CQI reductions or a threshold number of blind DL retransmission parameter adjustments, the general RLC retransmission rate is statistically too high for a given target CQI or a given number of blind DL retransmissions, and the like), the NodeB 120 (based on local determinations by the NodeB 120 and/or information received at the NodeB 120 from an associated RNC 130) forces the UE 110 to transition from the CELL_FACH state to the CELL_DCH state. It will be appreciated that the various embodiments of the various capabilities that are presented herein may be combined in various other ways. An exemplary embodiment is depicted and described with respect to FIG. 5.

Figure 5:
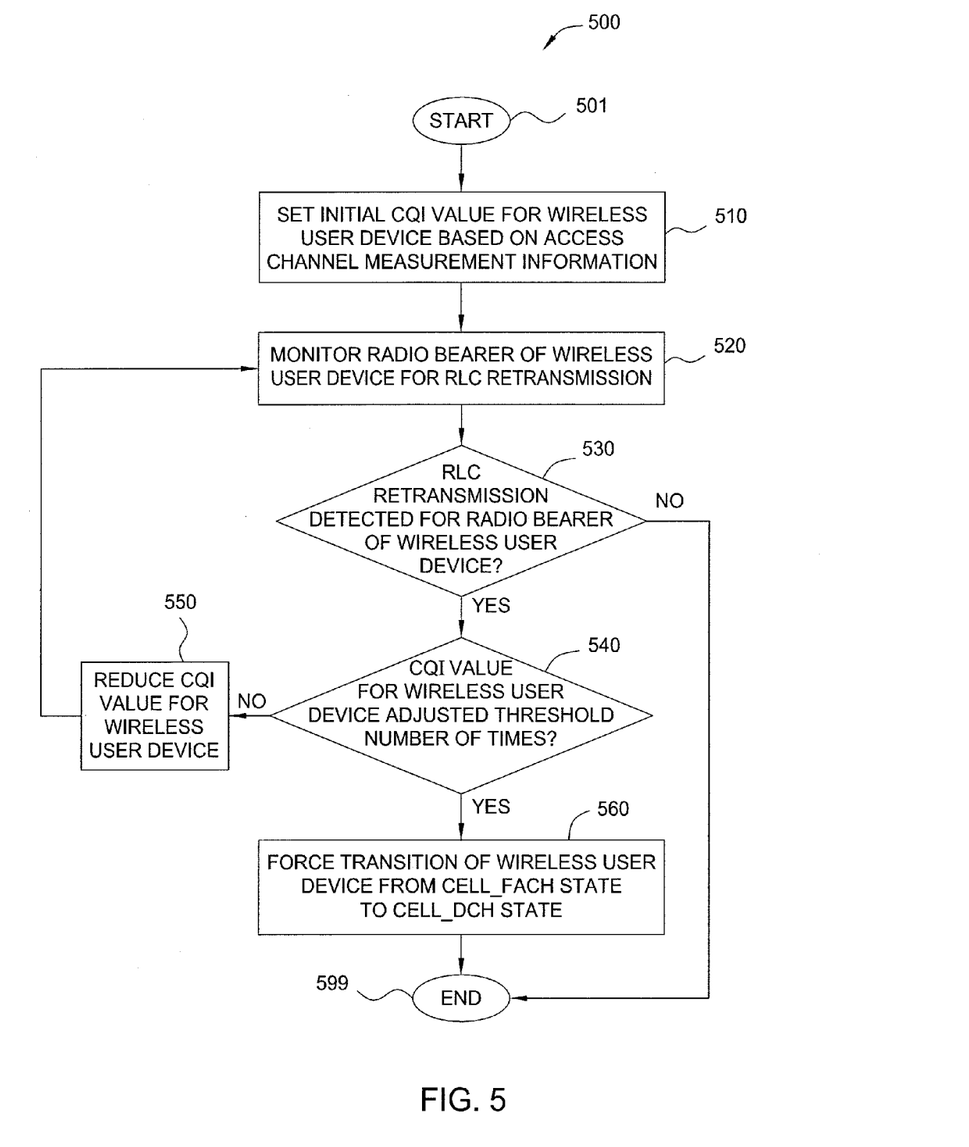
FIG. 5 depicts one embodiment of a method for controlling downlink transmissions for a wireless user device.

FIG. 5 depicts one embodiment of a method for controlling downlink transmissions for a WUD. It will be appreciated that, although primarily depicted and described as being performed serially, at least a portion of the steps of method 500 may be performed contemporaneously or in a different order than presented in FIG. 5.

At step 501, method 500 begins.

At step 510, an initial CQI value is set for the WUD based on measurement information associated with the access channel used by the WUD to access the wireless access device.

At step 520, an RB of the WUD is monitored to determine whether an RLC retransmission has occurred for the RB of the WUD based on the CQI value set for the WUD.

At step 530, a determination is made, based on monitoring of RLC retransmissions for the RB of the WUD, as to whether or not an RLC retransmission has been detected for the RB of the WUD based on the CQI value set for the WUD. If an RLC retransmission for the RB of the WUD has been detected (e.g., the current CQI value set for the WUD is inadequate), method 500 proceeds to step 540. If an RLC retransmission for the RB of the WUD has not been detected (e.g., the current CQI value set for the WUD is adequate), method 500 proceeds to step 599, where method 500 ends.

At step 540, a determination is made as to whether the CQI value for the WUD has been adjusted a threshold number of times. If the CQI value for the WUD has not been adjusted a threshold number of times, method 500 proceeds to step 550. If the CQI value for the WUD has been adjusted a threshold number of times, method 500 proceeds to step 560.

At step 550, the CQI value for the WUD is reduced by a given amount. The given amount may be a static value or may be a dynamically tuned during iterations of the steps for adjusting the CQI value for the WUD. From step 550, method 500 returns to step 520 such that the RB of the WUD may be monitored to determine whether an RLC retransmission has occurred for the RB of the WUD based on the CQI value set for the WUD.

At step 560, a forced transition of the WUD from the CELL_FACH state to the CELL_DCH state is initiated. The forced transition of the WUD from the CELL_FACH state to the CELL_DCH state may be initiated by propagating, toward the WUD, a state transition command configured for forcing the WUD to transition from the CELL_FACH state to the CELL_DCH state. From step 560, method 500 proceeds to step 599, where method 500 ends.

At step 599, method 500 ends.

It will be appreciated that, although primarily presented herein with respect to embodiments in which wireless transmission control is provided within a specific type of wireless communication network (e.g., a UMTS/HSPA wireless communication network, in at least some embodiments wireless transmission control may be provided within various other types of wireless communication networks (e.g., a Long Term Evolution (LTE) wireless communication network and the like). Accordingly, references herein to UEs, NodeBs, and RNCs may be read more generally as being references to WUDs, wireless access devices, and wireless network controllers, respectively.

Figure 6:
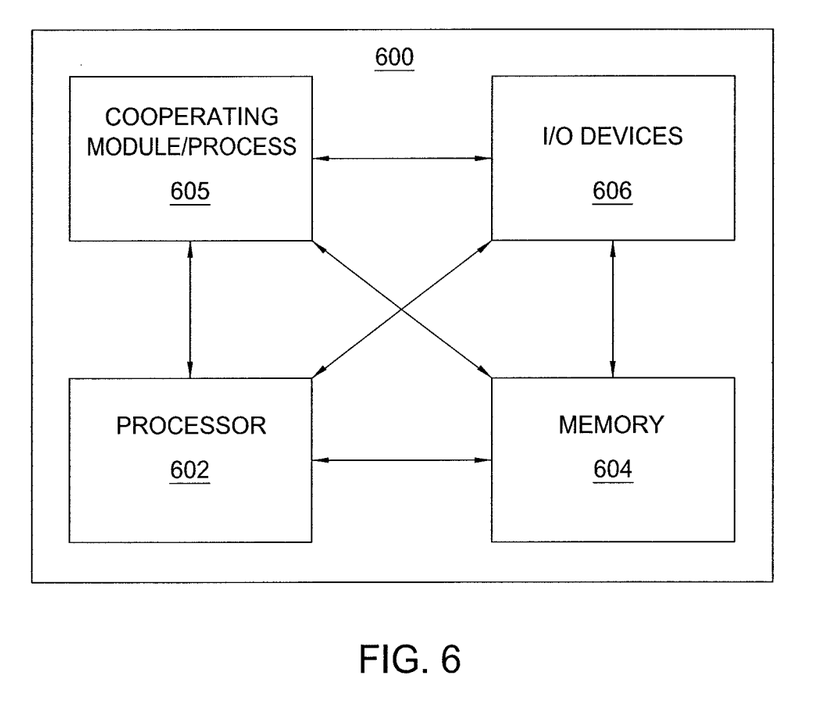
FIG. 6 depicts a high-level block diagram of a computer suitable for use in performing functions described herein.

FIG. 6 depicts a high-level block diagram of a computer suitable for use in performing functions described herein.

The computer 600 includes a processor 602 (e.g., a central processing unit (CPU) or other suitable processor(s)) and a memory 604 (e.g., a random access memory (RAM), a read only memory (ROM), and the like) that is communicatively connected to the processor 602.

The computer 600 also may include one or more input/output devices 606 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), and the like, as well as various combinations thereof).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein or portions of functional elements described herein. For example, computer 600 provides a general architecture and functionality suitable for implementing a UE 110, a portion of a UE 110, a NodeB 120, a portion of a NodeB 120, an RNC 130, a portion of an RNC 130, an element of MCN 140, a portion of an element of MCN 140, a WTCM 150, a portion of a WTCM 150, and the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, and the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., using "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
a processor and a memory communicatively connected to the processor, the processor configured to:
receive, by a network element, downlink (DL) channel operating parameter information associated with a set of cells of a wireless communication network, wherein the set of cells is configured to support a set of wireless user devices;
determine, by the network element based on the DL channel operating parameter information, DL channel operating parameter distribution information for the set of cells; and
determine, by the network element based on the DL channel operating parameter distribution information and based on a target for the set of cells, default DL channel operating parameter information for the set of cells, wherein the default DL channel operating parameter information is configured for use for one of the wireless user devices based on a determination that valid derived DL channel operating parameter information is unavailable for the one of the wireless user devices.

2. The apparatus of claim 1, wherein the DL channel operating parameter information comprises DL channel status information indicative of DL channel status for at least one of the wireless user devices.

3. The apparatus of claim 1, wherein the DL channel operating parameter information comprises at least one of:
one or more channel quality indicator (CQI) values reported by at least one of the wireless user devices; and
information indicative of a number of physical layer retransmissions requested by at least one of the wireless user devices.

4. The apparatus of claim 1, wherein the DL channel operating parameter distribution information comprises at least one of time-varying DL channel operating parameter distribution information, geographically-varying DL channel operating parameter distribution information, and time-and-geographically-varying DL channel operating parameter distribution information.

5. The apparatus of claim 1, wherein the DL channel operating parameter distribution information comprises information indicative of a statistical model of the DL channel operating parameter information.

6. The apparatus of claim 1, wherein the default DL channel operating parameter information comprises at least one of:
a default channel quality indicator (CQI) value; or
a value of a default number of blind DL retransmissions.

7. The apparatus of claim 1, wherein the determination that valid derived DL channel operating parameter information is unavailable for the one of the wireless user devices comprises at least one of:
a determination that the one of the wireless user devices is not configured to provide DL channel operating parameter information;
a determination that the one of the wireless user devices is configured to provide DL channel operating parameter information, but that the one of the wireless user devices has not yet provided DL channel operating parameter information; and
a determination that the one of the wireless user devices is configured to provide DL channel operating parameter information, but that DL channel operating parameter information received from the one of the wireless user devices is invalid.

8. The apparatus of claim 1, wherein the target for the set of cells comprises at least one of:
a target percentage of wireless user devices to be covered by the set of cells;
a target of favoring reliability over cell throughput capacity for Signaling Radio Bearers (SRBs);
a target of favoring cell throughput capacity over reliability for Traffic Radio Bearers (TRBs); and
a target of balancing at least two of reliability, cell throughput capacity, and latency.

9. The apparatus of claim 1, wherein the DL channel operating parameter information comprises a set of channel quality indicator (CQI) values, wherein the DL channel operating parameter distribution information comprises CQI distribution information, and wherein the default DL channel operating parameter information comprises at least one default CQI value.

10. The apparatus of claim 1, wherein the DL channel operating parameter information comprises information indicative of physical layer retransmissions requested by at least one of wireless user devices, wherein the DL channel operating parameter distribution information comprises physical layer retransmission distribution information, and wherein the default DL channel operating parameter information comprises a value of a default number of blind DL retransmissions.

11. The apparatus of claim 1, wherein the processor is configured to determine the default DL channel operating parameter information for the set of cells, based on the DL channel operating parameter distribution information and based on the target for the set of cells, by at least one of:
determining at least one of default Channel Quality Indicator (CQI) information and default blind DL retransmission information based on at least one of CQI distribution information associated with the set of cells and physical layer retransmission distribution information associated with the set of cells;
determining default CQI information by setting a value for a default number of blind DL retransmissions for the set of cells and adjusting the default CQI information based on the target associated with the set of cells; and
determining default blind DL retransmission information by setting a default CQI value for the set of cells and adjusting the default blind DL retransmission information based on the target associated with the set of cells.

12. A method, comprising:
receiving, by a network element comprising a processor and a memory, downlink (DL) channel operating parameter information associated with a set of cells of a wireless communication network, wherein the set of cells is configured to support a set of wireless user devices;
determining, by the network element based on the DL channel operating parameter information, DL channel operating parameter distribution information for the set of cells; and
determining, by the network element based on the DL channel operating parameter distribution information and based on a target for the set of cells, default DL channel operating parameter information for the set of cells, wherein the default DL channel operating parameter information is configured for use for one of the wireless user devices based on a determination that valid derived DL channel operating parameter information is unavailable for the one of the wireless user devices.

13. An apparatus, comprising:
a processor and a memory communicatively connected to the processor, the processor configured to:
determine radio link layer (RLL) retransmission information associated with a wireless user device;
determine, based on the RLL retransmission information associated with the wireless user device, whether to modify a downlink (DL) channel operating parameter associated with the wireless user device; and
based on a determination to modify the DL channel operating parameter associated with the wireless user device, determine a new value of the DL channel operating parameter by:
using a number or rate of RLL retransmissions detected for the wireless user device as a key into a look-up table; or
using a predetermined delta value for the DL channel operating parameter to modify an existing value of the DL channel operating parameter.

14. The apparatus of claim 13, wherein, to determine the RLL retransmission information associated with the wireless user device, the processor is configured to:
monitor for RLL retransmissions requested by the wireless user device.

15. The apparatus of claim 14, to monitor for RLL retransmissions requested by the wireless user device, the processor is configured to:
monitor for RLL retransmissions on one or more radio bearers (RBs) of the wireless user device.

16. The apparatus of claim 14, wherein the processor is configured to monitor for RLL retransmissions requested by the wireless user device based on an identifier of the wireless user device, logical channel information associated with the wireless user device, and sequence number information associated with a Radio Bearer (RB) of the wireless user device.

17. The apparatus of claim 13, wherein the DL channel operating parameter associated with the wireless user device comprises a Channel Quality Indicator (CQI) value or a value of a number of blind DL retransmissions.

18. The apparatus of claim 13, wherein the processor is configured to:
based on the determination to modify the DL channel operating parameter associated with the wireless user device:
propagate, toward a wireless access device serving the wireless user device, an indication that the DL channel operating parameter is to be modified.

19. The apparatus of claim 13, wherein the comprises processor is configured to:
    determine, based on the RLL retransmission information associated with the wireless user device, whether to modify a state of the wireless user device.

20. The apparatus of claim 19, wherein the processor is configured to:
    based on a determination to modify the state of the wireless user device:
        initiate a forced transition of the wireless user device from a first state to a second state.

21. The apparatus of claim 20, wherein the first state is a CELL_FACH state and the second state is a CELL_DCH state.

22. The apparatus of claim 19, wherein the processor is configured to:
    determine at least one characteristic of the wireless user device; and
    determine whether to modify the state of the wireless user device based on the RLL retransmission information associated with the wireless user device and the at least one characteristic of the wireless user device.

23. A method, comprising:
    determining, by a processor, radio link layer (RLL) retransmission information associated with a wireless user device;
    determining, based on the RLL retransmission information associated with the wireless user device, whether to modify a downlink (DL) channel operating parameter associated with the wireless user device; and
    based on a determination to modify the DL channel operating parameter associated with the wireless user device, determining a new value of the DL channel operating parameter by:
        using a number or rate of RLL retransmissions detected for the wireless user device as a key into a look-up table; or
        using a predetermined delta value for the DL channel operating parameter to modify an existing value of the DL channel operating parameter.

* * * * *